3,840,459
GREASE MANUFACTURE
Israel J. Heilweil, Princeton, and Frederick C. Schwab, Metuchen, N.J., assignors to Mobil Oil Corporation
No Drawing. Filed Nov. 2, 1971, Ser. No. 194,900
Int. Cl. C10m 5/22, 5/20, 7/50
U.S. Cl. 252—33.6   8 Claims

ABSTRACT OF THE DISCLOSURE

A process for grease manufacture is provided, which comprises conducting the slurry polymerization of a vinyl aromatic monomer in the presence of a cross-linking agent in a lubricating oil vehicle for a sufficient period of time to form an emulsion comprising polymer particles of the vinyl aromatic monomer; and thereafter treating the resulting emulsion with an agent capable of forming polar terminal groups attached to the molecules of the polymer particles to form a grease.

BACKGROUND OF THE INVENTION

(1) Field of the Invention

This invention relates to grease manufacture, and in one of its aspects relates more particularly to a process for grease manufacture in which the slurry polymerization of vinyl aromatic monomers is carried out under specific conditions in which an emulsion comprising polymer particles of the vinyl aromatic monomer is produced and is treated to form a grease.

(2) Description of the Prior Art

As is known to those skilled in the art, crystal polymers of vinyl aromatic monomers can be produced by free radical initiation in batch or continuous processes. These methods are disadvantageous in that they must be conducted slowly, inasmuch as long reaction times yield products which are high in oligomers and residual monomers. U.S. Pat. No. 3,041,312 has disclosed an anionic polymerization process which is carried out in a solvent that dissolves the polymer. In such process, the recovery of product must be achieved by separation in such manner as by distillation or by precipitating product employing large amounts of alcohol. In U.S. Pat. No. 3,095,388 there is disclosed the polymerization of acrylic monomers to produce stable dispersions of the polymers in organic liquid. Such dispersions are produced by employing block or graft copolymers in which one constituent comprises a rubber. In such process the rubber portion of the block polymer is soluble in the organic dispersing medium and the other constituent is insoluble in this medium but compatible with the polymer being formed. Such process involves the use of peroxide catalysts and relatively long reaction times. British Pat. No. 893,429 discloses a dispersion polymerization technique employing a lyophilic colloid and a peroxy catalyst. Where, for example the vinyl aromatic monomer is styrene, the dispersing medium is an alcohol. Other references which disclose a dispersion agent partly soluble in the organic liquid and partly soluble in the polymer but employing long term runs are set forth in British Pat. Nos. 1,007,476 and 1,008,188.

In copending application Ser. No. 142,821, filed May 12, 1971, is disclosed a rapid process for polymerizing a styrene monomer dispersed in a paraffinic or monoolefinic hydrocarbon slurrying medium and employing an anionic catalyst and a block polymer dispersing medium which is a glassy polymer at room temperature, having no unsaturation and a glass transition temperature greater than 50° C. Also disclosed in that application is provision for further block polymerization of the polystyrene product in which the initial polymerization reaction is permitted to proceed with the addition of monomers which can be polymerized anionically with the initial polystyrene product.

SUMMARY OF THE INVENTION

As more fully hereinafter described, in accordance with the present invention, an improved process for grease manufacture is provided. More specifically, there is provided a process for grease manufacture which comprises conducting the slurry polymerization of a vinyl aromatic monomer in the presence of a cross-linking agent in a lubricating oil vehicle for a sufficient period of time to form an emulsion comprising polymer particles of the vinyl aromatic monomer; and thereafter treating the resulting emulsion with an agent capable of forming polar terminal groups attached to the molecules of the polymer particles to form a grease.

In another modification of the invention, the slurry polymerization of the vinyl aromatic monomer is carried out with a hydrocarbon slurrying medium and in the presence of the cross-linking agent but without the presence of the lubricating oil vehicle. In this modification, following the aforementioned treatment of the resulting emulsion with the agent capable of forming polar terminal groups attached to the molecules of the polymer particles, the lubricating oil vehicle is added to the emulsion and the hydrocarbon slurrying medium is removed by heating. In general, the polymerization reaction is preferably conducted at a temperature from about 30° C. to about 100° C. The desired polymerization temperature is determined in part by the reflux temperature of the slurrying medium. Pressure may also be employed in order to elevate the reflux temperature of the slurrying medium.

In more specific aspects of the invention, any vinyl aromatic monomer may be employed for forming the desired grease composition. Representative of such monomers are styrene, p-methylstyrene, alpha methylstyrene, p-tertiary-butylstyrene, 2-vinyl pyridine, 4-vinyl pyridine, vinyl toluene, vinyl naphthalene and vinyl biphenyl. In accordance with the invention, the use of two or more monomers to produce copolymers, in addition to the use of a single monomer, is also contemplated.

The cross-linking agent employed in the polymerization process may include such representative materials as divinylbenzene tri(allyloxy)-s-triazine, divinyloxymethane and 1-vinyloxy-2-allyloxyethane.

The lubricating oil vehicle, employed in conjunction with the cross-linking agent may comprise any liquid mineral or synthetic hydrocarbon oil of lubricating viscosity, in an amount sufficient to form the desired grease. Such oils may therefore comprise any of the conventional hydrocarbon oils of lubricating viscosity, and may include mineral or synthetic lubricating oils, aliphatic phosphates, esters and di-esters, silicates, siloxanes and oxalkyl ethers and esters. Mineral lubricating oils, employed as the lubricating vehicle, may be of any suitable lubricating viscosity range from about 45 SSU at 100° F. to about 6000 SSU at 100° F. and, preferably, from about 50 to about 250 SSU at 210° F. These oils may have viscosity indexes varying from below 0 to about 100 or higher.

As hereinbefore indicated, the oil vehicles employed in the preparation of the grease formulations of the present invention may comprise mineral or synthetic oils of lubricating viscosity. When high temperature stability is not a requirement of the finished grease, mineral oils having a viscosity of at least 40 SSU at 100° F., and particularly those falling within the range from about 60 SSU to about 6,000 SSU at 100° F., may be employed. In instances where synthetic vehicles are employed rather than mineral oils, or in combination therewith, as the lubricating vehicle, various compounds of this type may be successfully utilized. Typical synthetic vehicles include: polypropylene, polypropylene glycol, trimethylol propane esters, neopentyl and pentaerythritol esters, di(2-ethyl hexyl) sebacate, di(2-ethyl hexyl) adipate, di-butyl phthalate, fluorocarbons, fluoroethers, fluorosilicones, silicate esters, silanes, esters of phosphorus-containing acids, liquid ureas, ferrocene derivatives, hydrogenated mineral oils, chain-type polyphenyls, siloxanes and silicones (poly-siloxanes), alkyl-substituted diphenyl ethers typified by a butyl-substituted bis(p-phenoxy phenyl) ether, phenoxy phenyl ethers, etc.

The catalyst employed in carrying out the polymerization reaction may comprise any conventional anionic polymerization catalyst. The anionic catalysts employed are basically of two types. One type is a mono-initiator such as butyl, secondary-butyl, tertiary-butyl, ethyl or amyl sodium, potassium, cesium, rubidium and lithium. Another type of initiator is the so-called di-initiator such as the lithium or sodium salts of alpha methyl styrene or 1,1-diphenylethylene. Still another type of initiator is the electron transfer type initiator which involves the lithium, sodium, potassium, cesium, rubidium complexes of naphthalene, biphenyl, anthracene and phenanthrene. The range of concentration of the initiator based upon the amount of styrene reactant is $10^{-1}$ to $10^{-4}$ moles of initiator/100 g. styrene.

The polymerization is carried out with the vinyl aromatic monomer dispersant in a non-solvent medium for the resulting polymer. In general, the slurrying medium is preferably a paraffinic or monoolefinic hydrocarbon having between about 4 and about 7 carbon atoms, which can be normal or branched. Typical slurrying media include butane, pentane, isopentane, hexane, heptane, 2,2-dimethylbutane, butene, pentene, as well as mixtures such as petroleum ether, pentane-pentene, hexane-hexene.

In conjunction with the slurrying medium and the catalyst, an AB or ABA block polymer dispersing or suspending medium may be employed in the polymerization step. This medium is used to maintain the polymer in suspension. In the block polymer suspending agent segment A is derived from the vinyl aromatic monomer, for example styrene, in amounts of 10 to 80 weight percent styrene based upon the total block polymer. Segment B may comprise an alkyl styrene, such as t-butylstyrene, whose polymer has ag lass transition temperature greater than 50° C. The amount of suspending agent employed may vary between about 0.1 to about 10.0 weight percent of the styrene reactant. The optimum amounts will depend upon the particular block polymer structure employed.

A block polymer dispersant that has been found to be particularly effective is a block polymer of styrene and t-butylstyrene. This block polymer is effective when it contains 10 to 80 weight percent styrene. This block polymer is particularly advantageous over the rubbery dispersants of the prior art in that very low concentration levels are effective. In addition, the new dispersants should not lower the softening temperature of the polystyrene nor contribute to oxidative degradation, as might be the case of the diene block polymers.

A more detailed description of the preparation of block polymers of this type is set forth in the aforementioned copending application Ser. No. 142,181.

The agent capable of forming polar terminal groups attached to the molecules of the polymer particles may include such materials as gaseous carbon dioxide, gaseous ethylene oxide, acrylonitrile, methacrylonitrile, ethylene sulfide, ethylene imine, methyl phosphine and their substituted derivatives.

The agents capable of forming polar terminal groups may also include materials of the above type or liquids and as solutions.

DESCRIPTION OF SPECIFIC EMBODIMENTS

The following examples, data and observations will serve to illustrate the novel process of the present invention for grease manufacture, as hereinbefore described:

Example I

In this example, the anionic slurry polymerization of polystyrene is carried out in the presence of a cross-linking agent in a petroleum base stock oil and terminated with gaseous carbon dioxide to form a grease in situ. In accordance with this example, 0.5 grams of a tertiary butyl styrene/styrene dispersant having the characteristics of containing 80% (wgt.) tertiary butyl styrene was dissolved in a mixture of 10.45 ml. of styrene monomer and 0.55 ml. of p-divinylbenzene. To this mixture was added 75 ml. of a stock oil, having the characteristics:

Saybolt
  At 100° F. _____ 630
  At 210° F. _____ 72
API Gravity _____ 29.0
Pour Point _____° F__ 0
Minimum Flash _____° F__ 510
ASTM Color _____ 2

The polymerization was initiated with 2.0 ml. of 1.27 molar secondary butyl lithium. After maintaining this mixture at 70° C. for a period of about 5 minutes, the polymer particles precipitated to form a thickened oil. After 30 minutes at 70° C., the resulting reaction product was treated with gaseous carbon dioxide. The red color of the styryl carbanion was changed to the off-white color of the grease by the addition of the $CO_2$ and cooled. The product thus obtained comprised a finished grease containing about 13%, by weight, of polystyrene. This grease has the following characteristics:

Unworked penetration _____ 305
Worked penetration _____ 328

Example II

Following the procedure described in Example I, the above-described reaction was carried out in hexane to produce a stable emulsion. The oil was added to the emulsion after the treatment with gaseous carbon dioxide, and the hexane was removed by heating. The resulting product comprised a smooth grease composition. This grease has the following characteristics:

Unworked penetration _____ 444
Worked penetration _____ 408

By following the procedures set forth in the above examples, other improved grease formulations may be similarly prepared by substitution of other vinyl aromatic monomers, cross-linking agents, oil vehicles, hydrocarbon slurrying media and agents capable of forming polar terminal groups attached to the molecules of the polymer particles; this includes the admixture of conventional soaps and of other types of greases known to the art (containing, for example, silicas, clays, asbestos, polymeric fluorocarbons, ureas, dyes and pigments) to the greases described herein. It will be understood that the grease compositions of the present invention may, if so desired, contain various additives or mixtures of such additives in order to further enhance their properties. Thus, these greases may contain such additives as extreme pressure agents, anti-rust additives, antioxidants, metal deactivators, water-proofing agents, adhesion agents and the like. It will also be understood that although the present invention has been described with preferred embodiments, various modifications and adaptations thereof may be resorted to without departing from the spirit and scope of the invention as those skilled in the art will readily appreciate.

We claim:

1. A process for grease manufacture which comprises slurry polymerizing at a temperature from about 30° C. to about 100° C. a vinyl aromatic monomer selected from the group consisting of styrene, p-methylstyrene, alpha methylstyrene, p-tertiary-butylstyrene, 2-vinyl pyridine, 4 - vinyl pyridine, vinyl toluene, vinyl naphthalene and vinyl biphenyl, in the presence of a cross-linking amount of a cross-linking agent selected from the group consisting of divinylbenzene, tri(allyloxy)-s-triazine, divinyloxymethane and 1-vinyloxy-2-allyloxyethane, and in the presence of a polymerization initiating amount of an anionic polymerization catalyst in a lubricating oil vehicle to form an emulsion comprising a polymer of said vinyl aromatic monomer, and thereafter treating the resulting product with an effective amount of an agent capable of forming polar terminal groups selected from the group consisting of gaseous carbon dioxide, gaseous ethylene oxide, acrylonitrile, methacrylonitrile, ethylene sulfide, ethylene imine, and methyl phosphine, to form a grease.

2. A process in accordance with Claim 1 wherein the polymerization is carried out with a hydrocarbon slurrying medium, but without the presence of the lubricating oil vehicle; the lubricating oil vehicle is subsequently added to the emulsion formed; and thereafter the slurrying medium is removed by heating, the slurrying medium being selected from the group consisting of butane, pentane, isopentane, hexane, heptane, 2,2-dimethylbutane, butene, pentene, petroleum ether and pentane-pentene, hexane-hexene mixtures.

3. A process in accordance with Claim 1 wherein said polymerization is carried out in the presence of a dispersing amount of a dispersant comprising a tertiary butyl styrene/styrene block copolymer.

4. A process in accordance with Claim 1 wherein said lubricating oil vehicle comprises a liquid hydrocarbon.

5. A process in accordance with Claim 2 wherein said lubricating oil vehicle comprises an ester lubricating oil.

6. A process in accordance with Claim 2 wherein said lubricating oil vehicle comprises a silicon lubricating oil.

7. A process in accordance with Claim 2 wherein said lubricating oil vehicle comprises a fluorine-containing lubricating oil.

8. A grease produced in accordance with the process of Claim 1.

References Cited
UNITED STATES PATENTS

| | | | |
|---|---|---|---|
| 2,698,298 | 12/1954 | Giammaria | 252—41 |
| 2,698,297 | 12/1954 | Giammaria | 252—41 |
| 2,698,299 | 12/1954 | Giammaria | 252—41 |
| 3,135,716 | 6/1964 | Uranek et al. | 260—45.5 |
| 3,402,160 | 9/1968 | Hayes | 260—93.55 |
| 3,257,340 | 6/1966 | Osmond | 260—876 B |
| 3,459,832 | 8/1969 | Kern | 260—881 |
| 3,137,682 | 6/1964 | Corson et al. | 260—93.5 S |

DANIEL E. WYMAN, Primary Examiner

I. VAUGHN, Assistant Examiner

U.S. Cl. X.R.

252—41, 42.7, 45, 46.4, 47, 48.2, 49.8, 49.9